United States Patent [19]
Koerber

[11] Patent Number: 5,889,992
[45] Date of Patent: Mar. 30, 1999

[54] METHOD FOR MAPPING TYPES STORED IN A MODEL IN AN OBJECT-ORIENTED REPOSITORY TO LANGUAGE CONSTRUCTS FOR A C BINDING FOR THE REPOSITORY

[75] Inventor: Paul Donald Koerber, Fountain Valley, Calif.

[73] Assignee: Unisys Corp., Bluebell, Pa.

[21] Appl. No.: 623,490

[22] Filed: Mar. 28, 1996

[51] Int. Cl.$^6$ .................................................. G06F 9/45
[52] U.S. Cl. ............................................................ 395/702
[58] Field of Search .................................. 395/704, 707, 395/708, 685

[56] References Cited

U.S. PATENT DOCUMENTS 5,421,015  5/1995  Khoyi et al. ............................. 395/680
5,557,776  9/1996  Brown et al. ............................ 395/704

OTHER PUBLICATIONS

Margaret Ellis & Bjarne Stroustrup, The Annotated C++ Reference, pp. 2–3, 1990.

*Primary Examiner*—Lucien U. Toplu
*Assistant Examiner*—Peter Stecker
*Attorney, Agent, or Firm*—J. Ronald Richebourg; Steven R. Peterson; Mark T. Starr

[57] ABSTRACT

The method of the present invention is useful in a computer system having a user interface, a CPU, a memory, at least one disk drive, and an object-oriented repository, a program operating in the computer system for accessing the object-oriented repository. The program executes a method for mapping types in a model stored in the repository to language constructs for a C binding to the repository. The method first processes each type in the model, then the program processes each data type in the model. Function declarations and C to C++ wrapper functions are generated for each type and data type.

12 Claims, 12 Drawing Sheets

METHOD FOR MAPPING TYPES STORED IN A MODEL IN AN OBJECT-ORIENTED REPOSITORY TO LANGUAGE CONSTRUCTS FOR A C BINDING FOR THE REPOSITORY

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to the field of object-oriented repositories in general, and in particular to a method for interfacing between an object-oriented repository employing the C++ programming language and programs written in another programming language.

BACKGROUND OF THE INVENTION

A repository enables the storage and reuse of information about an enterprise. Such information could be definitional (such as programs, files, and the relationships therebetween), management information (e.g., who can see certain types of information, etc.) and operational information (such as schedules, processes, etc.) In an object-oriented repository, this information is stored as objects that have data (e.g., name, salary, etc.) and behavior (e.g., change salary, etc.). The C++ language, with its object-oriented syntax is well suited as an interface to an object-oriented repository. For more information on such an interface reference is made to a co-pending patent application by Peter Johnson for A METHOD FOR PROVIDING OBJECT DATABASE INDEPENDENCE IN A PROGRAM WRITTEN USING THE C++ PROGRAMMING LANGUAGE, Ser. No. 08/505,140, filed Jul. 21, 1995; which application is assigned to the same assignee hereof.

However, having just a C++ interface limits the types of programs (or tools) that can have access to the object-oriented repository to only those programs written in the C++ language. It would be beneficial to have an interface that would allow access to the object-oriented repository by programs written in the C language. In addition, programs written in languages that can access dynamic link libraries (DLL's on Windows NT), or shared objects (UNIX), will benefit from access to an object-oriented repository by use of the method of the present invention. Examples of such language include Visual Basic, Smalltalk and other similar languages.

A problem with C interfaces to object-oriented databases is that the functions provided are not tailored to the types in the database. For example, in some implementations in order to create an object in the database, the C program must first call the database to retrieve a representation of the desired type, then call a generic create function to create the object. The method of the present invention solves this problem by generating functions tailored to each of the types in a model in the repository. One function call is required to create an object of a specific type. Similarly, one function call is used to access the properties and operations of types in the repository Another problem with C interfaces to object-oriented databases is that the functionality available through the C interface is limited compared to the C++ interface to the same object-oriented database. This invention provides almost 100% of the functionality available through the public C++ interface to the repository.

Still another problem is that the C and C++ interfaces can be constructed quite differently with much of the object-orientedness of the types in the database being lost when translated to C. The method of the present invention provides a C interface that maps the C++ types, operations and properties in a straightforward manner to the C language. This reduces the amount of documentation necessary for both interfaces, as well as programmer learning time going from one interface to the other.

The present invention provides a C interface to an object oriented repository by making the public properties and operations of the types in the repository available to programs written in the C language, or accessed via DLLs, or shared objects from other languages. A program written in the C language can open an object-oriented repository, log in to the repository, begin a repository session, and create, retrieve, and modify instances of the types in the repository. The purpose of the method of the present invention is to convert the types, properties, and operations defined for a model into constructs understood by a C compiler, for example. The Application Program Interface (API) for the C binding includes a set of header files that contain the C type and function declarations necessary to access instances of the types in the object-oriented repository. A set of C++ files provides a wrapping between the C functions that can be called by a program written in the C language and the C++ interface provided by the object-oriented repository.

BRIEF SUMMARY OF THE INVENTION:

It is therefore an object of the present invention to provide a well-defined interface to an object-oriented repository for a program written in the C language.

Still another object of the present invention is to provide mapping of the types and features of an object-oriented repository to the C programming language.

Yet another object of the present invention is to allow languages that call a dynamic link library (DLL) to access the object-oriented repository through the C binding.

The method of the present invention is useful in a computer system having a user interface, a CPU, a memory, at least one disk drive, and an object-oriented repository, a program operating in the computer system for accessing the object-oriented repository. The program executes a method for mapping types in a model stored in the repository to language constructs for a C binding to the repository comprising the steps of: for each type in the model, determining if a current one of the types is valid for C binding, and if so; generating function declarations for the current type; generating C to C++ wrapper functions for the current type; determining if there are more of the types in the model, and if so, repeating the steps above. If there are no more types, then the program continues processing for each data type in the model, determining if a current one of the data types is valid for C binding, and if so; generating function declarations for the current data type; generating C to C++ wrapper functions for the current data type; and, determining if there are more data types in the model, and if so, repeating the last three steps hereof. If there are no more data types in the model, stopping the program.

DETAILED DESCRIPTION

Before proceeding with a detailed description of the method of the present invention a background discussion of object-oriented repositories would be helpful. This discussion will focus on the terminology used herein. Background information that may be helpful in understanding the present invention may be had by reference to U.S. Pat. No. 5,644,764 also assigned to the assignee of this application and entitled A METHOD FOR SUPPORTING OBJECT MODELING IN A REPOSITORY.

The term "binding" as used herein refers to a mapping of the types and features (i.e., attributes, references, and operations) of a model to language constructs, such as C functions for C binding, or C++ classes and operations for C++ binding. An example of binding would be to assign a Word macro to a key combination in Word for Windows. The user binds the macro to a key (e.g., alt-s) so that when one presses alt-s, the macro gets executed. In the context of a repository, such as the Universal Repository (UREP) available from Unisys Corporation of Blue Bell, Pa., calling C functions in the UREP C binding causes the corresponding repository operations to be executed. The term "mapping" as used herein refers to the establishment of a correspondence between two sets that associates each member of the first set (i.e., types) with a single member of the other set (i.e., language constructs for C binding for the repository). Additional background information on object technology and terminology is also given hereinbelow to provide a common ground in which to discuss the invention.

Figure 1:
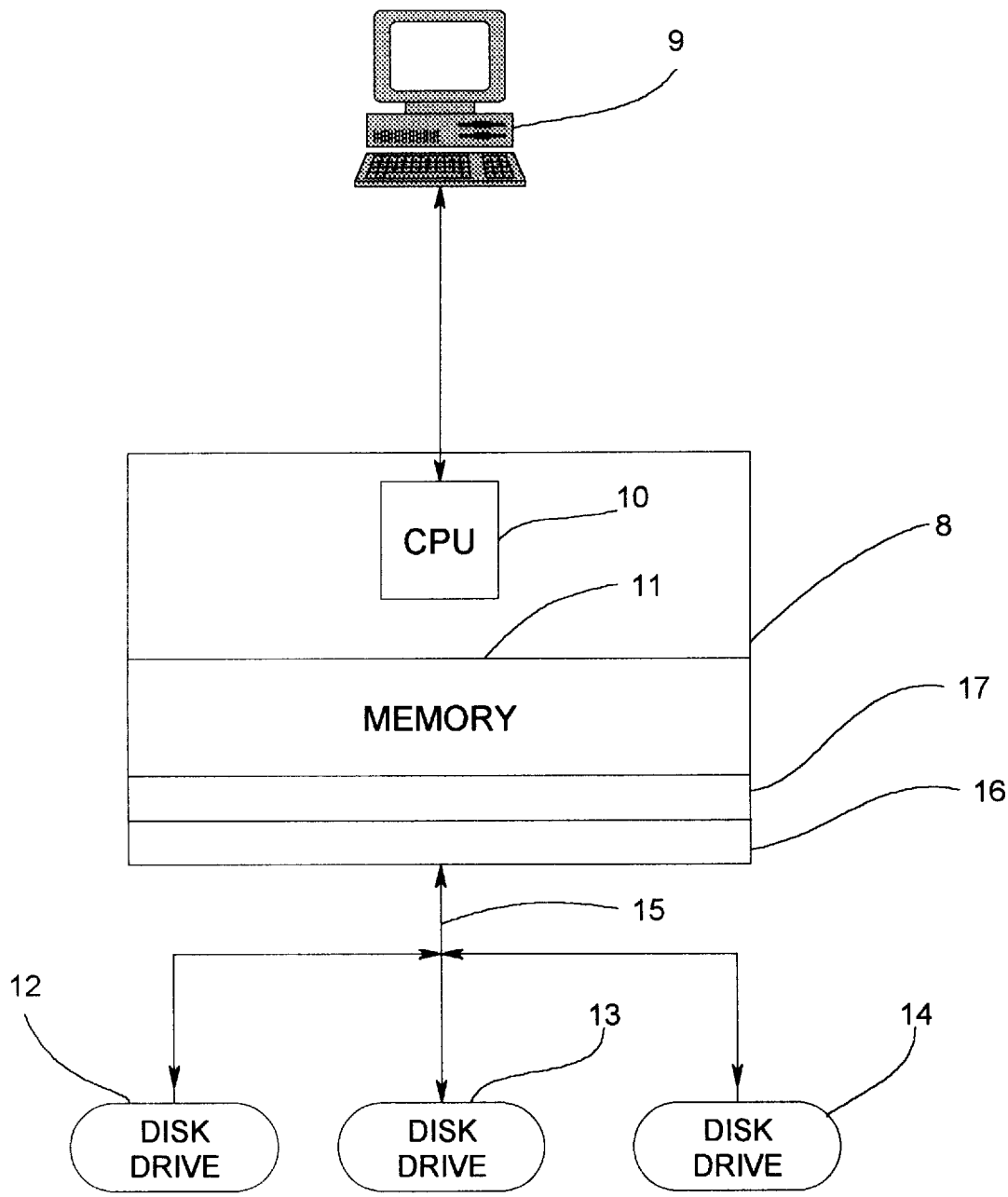
FIG. 1 a generalized block diagram of a system that may use the method of the present invention.

Referring now to the drawings and FIG. 1 in particular, a block diagram is shown of a computer system 8 including an operator console 9 a CPU 10 and a memory 11. The system 8 has access to databases stored in disk drives 12, 13 and 14 by means of a bus 15 coupled through an application programming interface ("API") 16. The API 16 is coupled to the system 8 by means of a C binding layer, which is schematically illustrated in FIG. 1 as layer 17 representing the method of the present invention. That is, the software running in the memory 11 accesses one or more of the databases 12–14 by means of the C binding layer 17.

Object Terminology

A normal object program stores objects in the computer system's memory 11. When the program terminates, the memory used by those objects is freed and reused by other programs, making the objects that the program stored transient. An object database stores objects on a computer disk. Since the information on a computer disk remains in existence, even when the computer is turned off, an object database provides the ability to persistently store objects. An object program that uses an object database thus has the option of storing objects transiently or persistently.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. But, if the customer opened multiple accounts, the customer's name and address would appear in multiple account objects. Therefore, it is desirable to define a separate customer object and place the name and address as attributes of the customer object. The customer account object would then contain a reference to the customer object.

Figure 2:
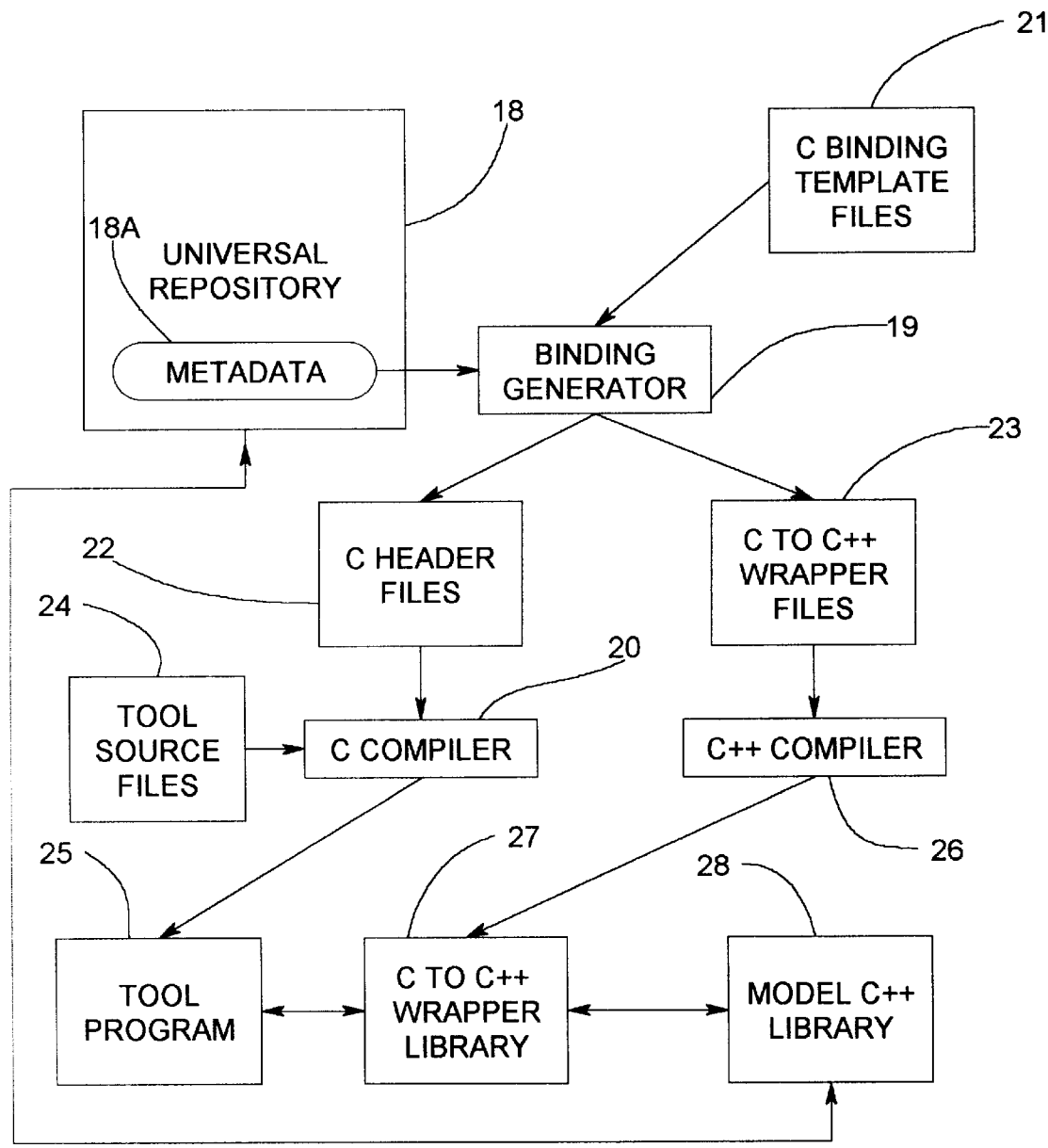
FIG. 2 is a block diagram illustrating the binding generation and run-time environment.

With reference to FIG. 2, a block diagram is shown that illustrates the binding generation and run-time environment. A Universal Repository ("UREP") 18 includes a metadata service 18A, which is a repository service for retrieving information about a model stored in the repository. A binding generator 19 is disposed for converting the types, properties and operations defined for the model into constructs understood by a C compiler 20. A C binding template files 21 provides an interpreted language used by the generator 19 to produce C header files 22, and C to C++ wrapper files 23. The C to C++ wrapper files provide an interface between the C functions and the equivalent C++ operations. The C compiler 20 accepts a tool source file 24 and the C header files 22 to produce a tool program 25.

The C to C++ wrapper files 23 are compiled and linked by a C++ compiler 26 into a C to C++ wrapper library 27. The functions performed by the wrapper library 27 check the validity of C parameters and call equivalent C++ functions in a corresponding model C++ library 28. The function performed by the C to C++ wrapper library 27 takes care of any parameter and return value translation to and from C and C++. At run-time, the tool program 25 makes C calls to the C to C++ wrapper library 27, which in turn calls the model C++ library 28.

Figure 3:
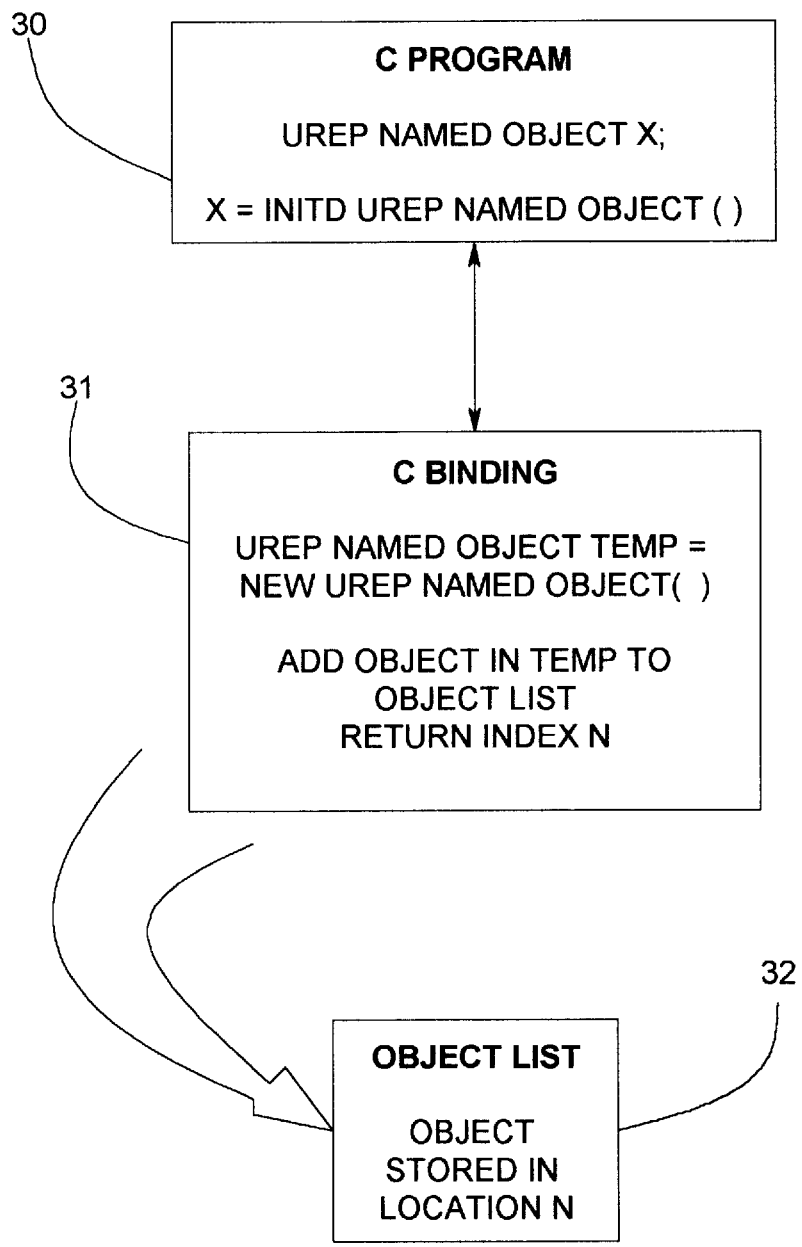
FIG. 3 illustrates an example of constructing a surrogate object in a C program.

Referring now to FIG. 3, an example of constructing a repository object in a C program is illustrated. The C program is graphically depicted by a block 30, wherein a function call, initdUrepNamedobject, is illustrated as creating an instance of the UrepNamedobject type in memory. When the function is called by the C program, C Binding (block 31) creates a new instance of the UrepNamedobject type on the heap. This new object is added to the next free entry (N) in the object list (block 32) maintained by the C Binding 31. The index of the entry is returned to the calling C program 30. The value of X is the index.

Figure 4:
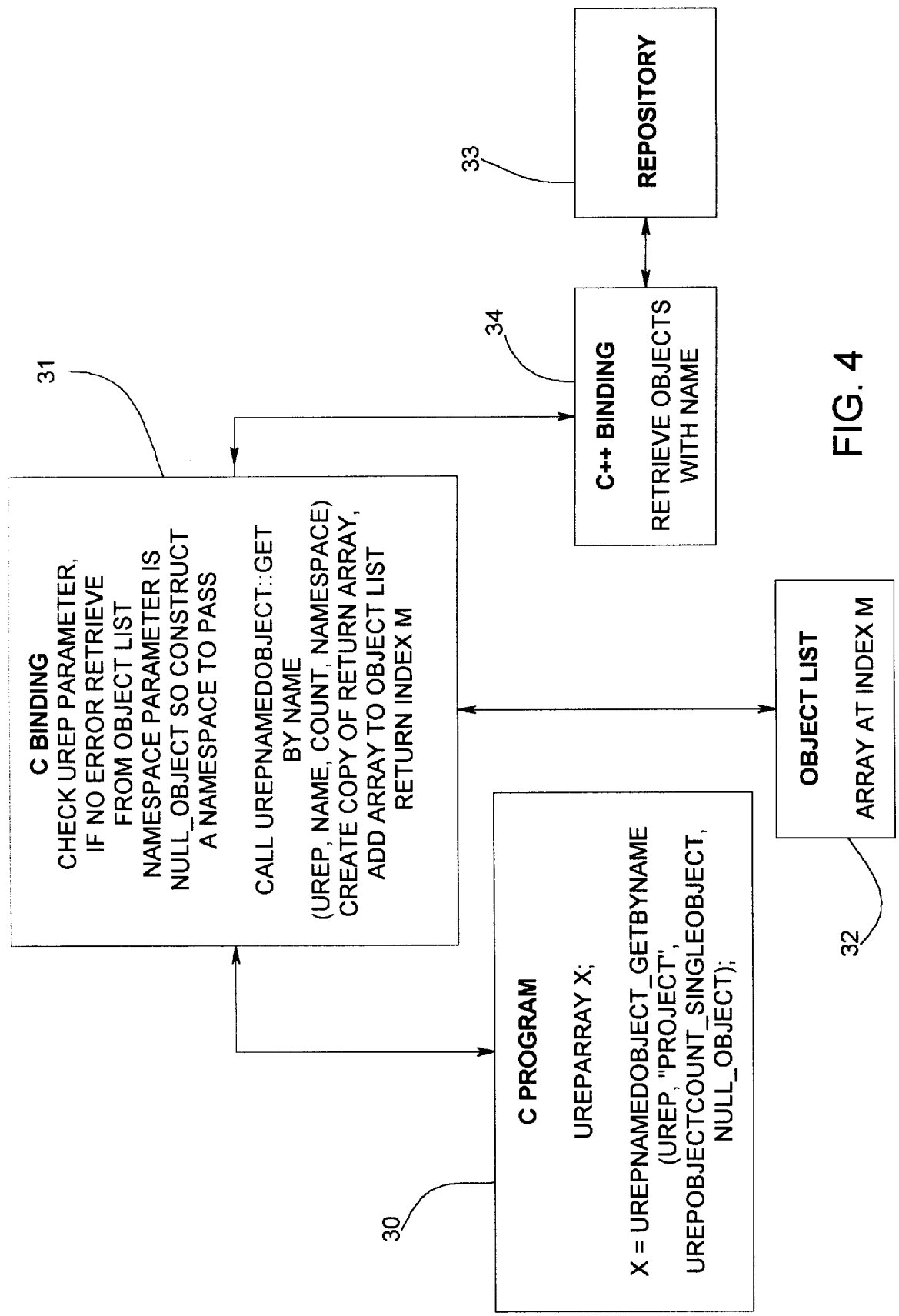
FIG. 4 illustrates an example of calling an operation on objects in a repository from a C program.

Referring now to FIG. 4, the C program 30 declares a variable, X, of type UrepArray. This variable will hold the return value. Next the C program 30 calls the "UrepNamedObject_getByName" function, passing four parameters. The last parameter indicates that no value is passed for an optional parameter. Inside the C Binding (block 31), the parameters that are objects (the first and last in this case) are checked. The first parameter is checked to make sure it is of type UREP. If it is, it is retrieved from the object list (32). The last parameter is null (NULL-OBJECT) and was passed, so a UrepNamespace is constructed to pass as a parameter. Then the C++ operation, UrepPersistentObject::getByName is called, passing in four parameters: The UREP object retrieved from the object list 32, the string variable, name, the enumerated variable, count, and the namespace object that was constructed inside the C Binding 31.

The operation is in the C++ binding (block 33), which calls the repository to retrieve the objects with the desired name in the default namespace. The C++ Binding 33 returns a UrepArray of UrepNamedObjects to the caller, the C Binding 31. The C Binding then creates a copy of the array on the heap and adds it to the next empty entry in the object list. The index of this entry (M), is returned to the C program 30. The C program now has an index which allows it to call functions which accept a UrepArray, such as size and lookup.

Description of one Embodiment: C language binding to an Object-Oriented Repository C Access to Objects In the C interface, surrogate objects are used to access instances of UREP types, whether persistent or transient. The term "UREP" or "Urep" refers to a Universal Repository, which is a software product available from Unisys Corporation, assignee of this patent application. Because the C language does not have classes or objects, a C typedef is created for each UREP type. The term "typedef" is a language construct of the C programming language, which is used to give a name to a data type. Variables declared using these typedefs are surrogate objects and represent links to instances of the corresponding UREP type. These surrogate objects can then be initialized and used as parameters to UREP operations. The typedef is used to hide the implementation of the C binding. An example surrogate object declaration is:

UrepVersionedObject myobj;

As used herein, the terms object and instance are used to represent a persistent or transient instance of a UREP type or model type, even though the C language itself does not have similar concepts. An object initializer function must be called to initialize the object before it is used. Once initialized, an object must be explicitly destructed because there is no way for a destruct function to be called when an object goes out of scope. To destruct an object, the destructobject function is called:

destructObject(myObj);

For persistent objects the destructobject function only destructs the object and frees up any memory used by the object in the C binding, it does not destruct any persistent object in the repository. If the object is a transient type, the value of the object is also destructed.

Data Types

Data types are used as the types of properties, and parameters and return values of operations. For some of the UREP data types, the C binding provides a mapping to an equivalent C type. The following list of typedefs shows the mapping between the UREP data type and the C data type. Whenever the UREP data type appears in a model, the corresponding C typedef is used in the C binding.

| typedef int | udt_boolean |
|---|---|
| #define TRUE | 1 |
| #define FALSE | 0 |
| typedef unsigned char | udt_char; |
| typedef long | udt_integer; |
| typedef double | udt_real; |
| typedef char * | udt_string; |
| typedef const char * | udt_cstring |

The UREP data type name is not used for the typedef name, because it is still necessary to provide access to objects of these types using the UREP data type name. For example, the format operation may need to be called on instance of a data type.

When the data type has a subtype defined in the model, then the same typedef is used for that type. For example, UrepId is a subtype of UrepString. In the C binding, the udt_string typedef would be used. The underlying C++ implementation will handle the length restriction. The actual definition of the typedefs may change on different platforms for the C data types so that the memory layout for the data type is equivalent on all platforms.

Model Types

The C typedef hierarchy for UREP is extended by typedefs for the types in a model. The naming rules of C++ Binding determine the name of the type. The type name is also used as a prefix for many of the generated C binding names. Whenever <type name> is used in this document, it is referring to the name created by following the naming rules.

The name of the initializer function for the object is init<type name>. The function must be called to initialize the object for the C Binding before other UREP functions are called using the object as a parameter. These functions are equivalent to the C++ constructors defined in the C++ API. The prefix of "construct" was not used because it might cause confusion with the construct operation defined for the persistent types.

Each persistent type defined in the model has three object initializer functions generated for it. The initializer functions initialize an object that is not linked to any instance of a persistent object. The C function declarations for the first two functions are in the following format:

```
<type name>
initd<type name>();

<type name>
init<type name>
    (UREP urep
    );
```

The first initializer function uses the globalurep instance to initialize the object, while the second function uses the UREP instance passed as a parameter for the same purpose. The third initializer function has an object parameter for an object of the same type. The format for the C declaration is:

```
<type name>
copy<type name>
    (<type name> copyObject
    ,udt_boolean restricted
);
```

The return value of this function is a copy of the object copyobject. If copyobject was linked to a persistent object in the repository, then the new object is linked to the same object. If restricted is TRUE, then the returned object is restricted to type <type name>. This is useful in those cases where an operation is overridden in one or more subtypes, but the tool needs to call the operation on type <type name>, not on any of its subtypes.

For example, the UREP type UrepMetaClass will have the following initializer functions generated for it:

```
UrepMetaClass
initdUrepMetaClass();

UrepMetaClass
initUrepMetaClass
    (UREP urep
    );

UrepMetaClass
copyUrepMetaClass
    (UrepMetaClass copyObject
    ,udt_boolean restricted);
```

For example, to create an object of type UrepNamedVersionedObject:
    UrepNamedVersionedobject           NVO =
        initUrepNamedVersionedobject(globalUrep);
In this example, "globalurep" is the global instance of the UREP type, and was used to open the repository prior to this code. At this point in the code, the variable NVO is not actually linked to any object in the repository. Any attempt to use an operation defined for the UrepNamedVersionedObject type using the NVO object will return an unlinked object error.

Transient types have two or three object initializer functions defined for each type depending on whether the object represents a basic C data type or not. There is a base initializer function, a copy initializer function, and an initializer function that accepts a basic C data type to provide a conversion to a UREP data type. The latter is equivalent to the type conversion operator for the basic C type. None of the initializer functions require an instance of the UREP type as a parameter, because these are transient types. If the initializer function is successful, an instance of the corresponding transient type is created and returned. If the function is not successful, an error is pushed on the globalurep instance. The returned C object is marked internally as invalid and will cause an error if it is used as a parameter to a function.

The C function declaration of the base initializer is as follows:

```
<type name>
init<type name>();
```

The result is that an instance of <type name> is constructed and returned. The copy initializer function takes an object of the same type. The C function declaration is as follows:

```
<type name>
copy<type name>
    (<type name> copyObject);
```

The return value of this function is a copy of the object copyobject. For object types that represent the C types, the third initializer function accepts an argument of that C type. The C declaration of the function is as follows:

```
<type name>
convert<type name>
    (<C type> value);
```

The return value is an object that is linked to an instance of <type name> that was created in the function, with the value.

For example, the UrepInteger type has the following initializer functions defined for it:

```
UrepInteger
initUrepInteger();

UrepInteger
copyUrepInteger
    (UrepInteger copyObject);

UrepInteger
convertUrepInteger
    (udt_integer value);
```

Enumerations

The structure for the declaration of the enumerated type (items appearing between "[ ]" are optional) is as follows:

```
typedef enum
{
    <enumerated type name>_<mnemonic 1> [= <value>],
    <enumerated type name>_<mnemonic 2> [= <value>],
    .   .           .
    .   .           .
    .   .           .
    <enumerated type name>_<mnemonic n> [= <value>]
} <enumerated type name>;
```

The <enumerated type name>_<mnemonic> for C mnemonic names ensures uniqueness of the names. For example, the declaration for UrepCardinality would be:

```
typedef enum
{
    UrepCardinality_sv = 0,
    UrepCardinality_mv = 1
} UrepCardinality;
```

The notification mnemonics for the error and warning messages for a model are also declared in a similar fashion. The enum name is <model prefix>_Notification. The mnemonic names are then formed as described above.

Properties

For each property of a type there are several functions generated depending on the type and cardinality of the property. For properties whose type has a corresponding C data type, the <type> will be the C data type rather than object type. An additional get and set function is generated that accepts an object. The list of functions generated is for a property whose collection type is UrepArray. The functions are different for the different collection types. For example, the accessor and mutator function declarations for the maxVariantWidth property of the UrepSystemProfile type are:

```
udt_integer
UrepSystemProfile_get_maxVariantWidth
    (UrepSystemProfile myself);

void
UrepSystemProfile_set_maxVariantWidth
    (UrepSystemProfile myself
    ,udt_integer value);
```

The C function declarations for the top property of the UrepCompositeContext type are:

```
UrepVersionedObject
UrepCompositeContext_get_top
    (UrepCompositeContext myself);

void
UrepCompositeContext_set_top
    (UrepCompositeContext myself
    ,UrepVersionedObject value);

udt_boolean
UrepCompositeContext_isNull_top
    (UrepCompositeContext myself);

void
UrepCompositeContext_flush_top
    (UrepCompositeContext myself);
```

The C function declarations for the topObjectFor property of the UrepversionedObject type are:

```
    UrepArray_UrepCompositeContext
    UrepVersionedObject_get_topObjectFor
            (UrepVersionedObject myself);
    udt_boolean
    UrepVersionedObject_contains_topObjectFor
            (UrepVersionedObject myself
            ,UrepCompositeContext object);
    udt_integer
    UrepVersionedObject_size_topObjectFor
            (UrepVersionedObject myself);
    void
    UrepVersionedObject_set_topObjectFor
            (UrepVersionedObject myself
            ,UrepArray_UrepCompositeContext value);
    void
    UrepVersionedObject_add_topObjectFor
            (UrepVersionedObject myself
            ,UrepCompositeContext value)
    void
    UrepVersionedObject_remove_topObjectFor
            (UrepVersionedcObject myself
            ,UrepCompositeContext object);
    udt_boolean
    UrepVersionedObject_isNull_topObjectFor
            (UrepVersionedObject myself);
    void
    UrepVersionedObject_flush_topObjectFor
            (UrepVersionedObject myself);
```

A property can have several different constraints: access mode, class, and index. A property can have an access mode of read write, read only, or no access. Table 1 shows whether the accessor or mutator functions are generated for each access mode.

TABLE 1

Access and Mutator Function Generation

| Access Mode | Accessors | Mutators |
|---|---|---|
| read write | generated | generated |
| read only | generated | not generated |
| no access | not generated | not generated |

Accessor functions also include the get, isNull, size, and contains functions. Mutator functions include flush, remove, add, as well as set. Changing the access mode to read only or no access should be done with care, because the properties cannot be changed or accessed, respectively, in C functions that implement operations for the type.

Properties for a type can have the class constraint. In this case, the property has a single value for all instances of the type. The accessor and mutator functions for a property with the class constraint are the same as other accessor and mutator functions, except that the first parameter, myself, is replaced by an object of type UREP. The following shows the format for an accessor function for a property with the class constraint:

```
<property type> <type name>_get_<property name>(UREP
    urep);
```

The following is the format for a mutator function for a property with the class constraint:

```
void <type name>_set_<property name>
    (UREP urep
    ,<property type> value
    );
```

A single-valued property of a type can also have the index constraint. This constraint indicates that the property is used as an index to retrieve instances of the type. In addition to the accessor and mutator functions a find function is generated. This function takes the form:

```
<type name> <type name>_find_<property name>
    (<property type> value);
```

For instance, in the RSM, the id property of UrepNamespace has the index constraint. The generated find function is:

UrepNamespace UrepNamespace_find_id(udt_cstring id);

Operations

Operations can be defined for the types in a model. The format for a function declaration in C corresponding to an operation is:

```
<return type> <type name>_<operation name>
    (<type name> myself
    [, <parameters> ]
    );
```

The additional parameter myself is always inserted at the front of the parameter list for each operation that is an operation for a type, with the exception of operations which have the class constraint. This parameter is the object for which the operation is called. Parameter names and types are the same as those defined in the model for the operation. For example, the reserve operation on UrepVersionedObject is declared as:

```
UrepVersionedObject
UrepVersionedObject__reserve
        (UrepVersionedObject myself
        ,udt__cstring variant
        ,udt__boolean reserveComponent
        );
```

Table 2 describes for the different types how they are passed as parameters and returned as result values for operations.

TABLE 2

Parameters and Return Types.

| Type | Return | Input Parameter | Input/Output Output Param |
|---|---|---|---|
| udt__boolean, udt__char, udt__integer, udt__real, enumerated types | value (that is, <type>) | value | pointer (that. is, <type>*) |
| UrepObject (and subtypes) | value | value | pointer |
| udt__string, udt__cstring | pointer (already a pointer) | pointer | pointer |

For enumerated types, the C enum type name will be used as the formal parameter type, rather than a data type such as udt__integer. If the return type of the operation is a UREP data type that has a C equivalent, or one of the parameters is of that type (or both) an additional function declaration is generated. This function specifies a <data type> in place of the parameter(s) and a <data type> in place of the return value that were specified as C data types in the normal operation declaration. The C format for this function declaration is:

```
<data type>
<type name>__<operation name>__obj
        (<type name> myself
        [, <parameters> ]
        );
```

For example, the accessor and mutator functions for the maxvariantWidth property of the UrepSystemProfile type also has these function declarations:

```
UrepInteger
UrepSystemProfile__get__maxVariantWidth__obj
        (UrepSystemProfile myself);
void
UrepSystemProfile__set__maxVariantWidth__obj
        (UrepSystemProfile myself
        ,UrepInteger value
        );
```

Only one such function is generated for each operation with a parameter or return value of the appropriate type. All permutations of the operation for the combinations of objects and values are not generated.

Operations declared with a class constraint do not have the myself parameter. The format for the corresponding C function declaration is:

```
<return type>
<type name>__<operation name>
        (UREP urep
        [, <parameters> ]
        );
```

Operations can have an access mode constraint with the values of public access, protected access, and private access. Only those operations with an access mode constraint of public access will have C function declarations. Changing the access mode of an operation to protected or private access means that it is not available in the C binding, because of the limitations of the C language.

The constructor operations used in the C++ Binding are not generated in the C binding. The object initializer functions discussed earlier take the place of these operations. In order to remove a persistent object from the repository, the destruct operation of the UrepPersistentObject type must be called because a destruct operation is not generated for each type. The destructobject function used to delete the memory used by the C object, does not remove the linked object from the repository. The following is the C function declaration for the destruct operation for UrepPersistentObject:

```
void
UrepPersistentObject__destruct
        (UrepPersistentobject myself
        ,UrepReferenceProcessing freeMode
        );
```

The following example shows how to destruct an instance of UrepNamedVersionedObject. NVO is an object variable that is linked to an instance of UrepNamedVersionedObject.

```
UrepPersistentObject__destruct(NVO,
UrepReferenceProcessing__objectOnly);
```

For transient object types, there is no defined destruct operation. Instead, the destructobject function defined earlier destroys the object and any memory associated with it, as well as any internal memory associated with the object. It should be noted that it is important to call the destructobject function for all objects (whether linked to persistent, transient, or not linked at all) so that memory in the C program is released properly. This does not occur automatically.

Figure 5:
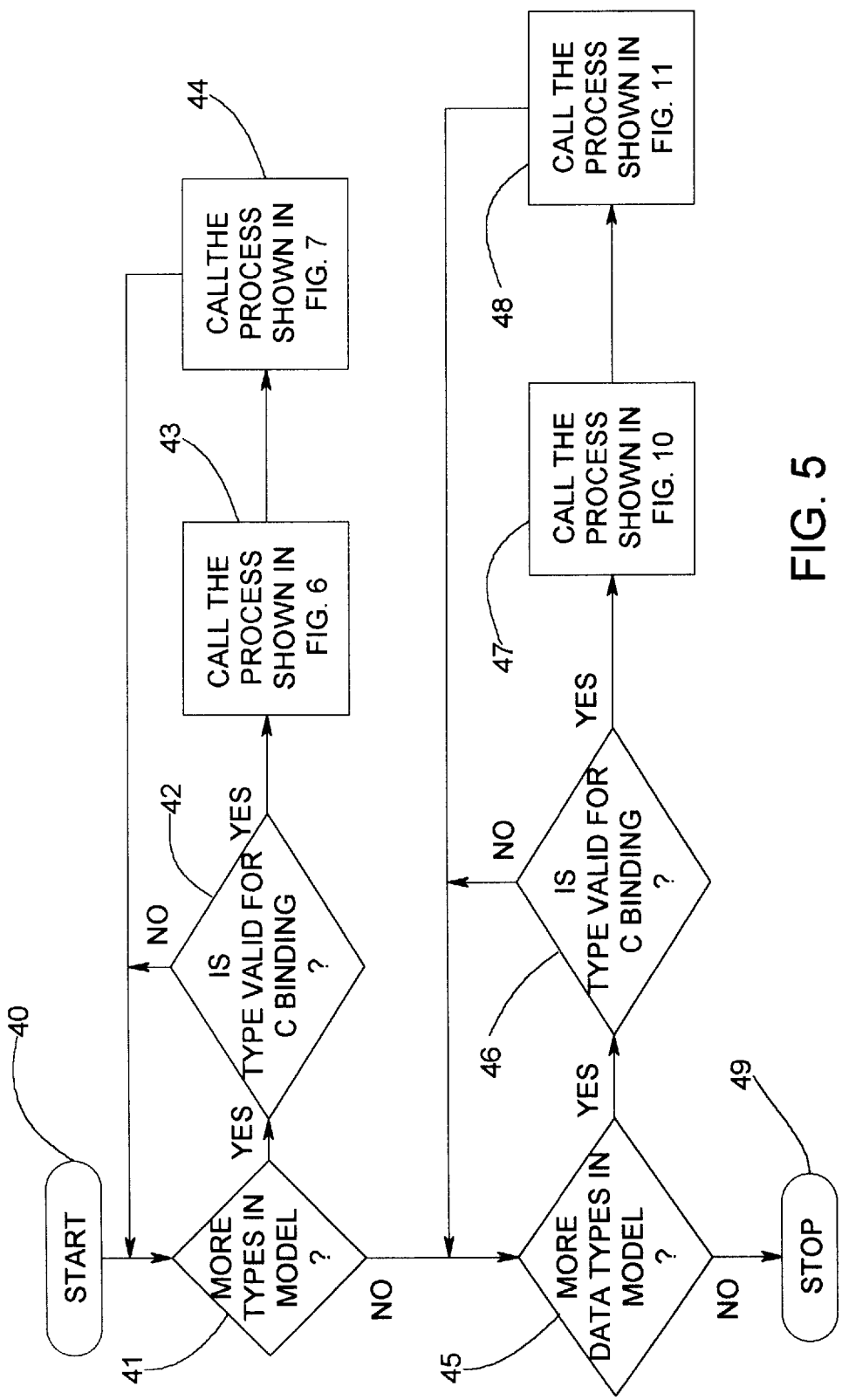
FIG. 5 is a flow chart that illustrates the steps for generating C binding.

Referring now to FIG. 5, a flow chart of the steps for generating C binding is illustrated. The process begins with a start bubble 40, followed by an inquiry as to whether or not there are more types in model (diamond 41). If the answer to this inquiry is yes, then another inquiry is made as to whether or not the type is valid for C binding (diamond 42). That is, this inquiry determines if the type is publicly accessible. If the answer to this inquiry is no, then a return is made back to the diamond 41 processing the next type. On the other hand, if the answer to this inquiry is yes, then the process shown in FIG. 6 and described hereinafter is called (block 43). This process generates the function declarations for types. Next, another process is called to generate C to C++ wrapper functions (block 44). This process is shown in FIG. 7 and described further hereinafter. Finally, a return is made back to the diamond 41 to process the next type.

Figure 10:
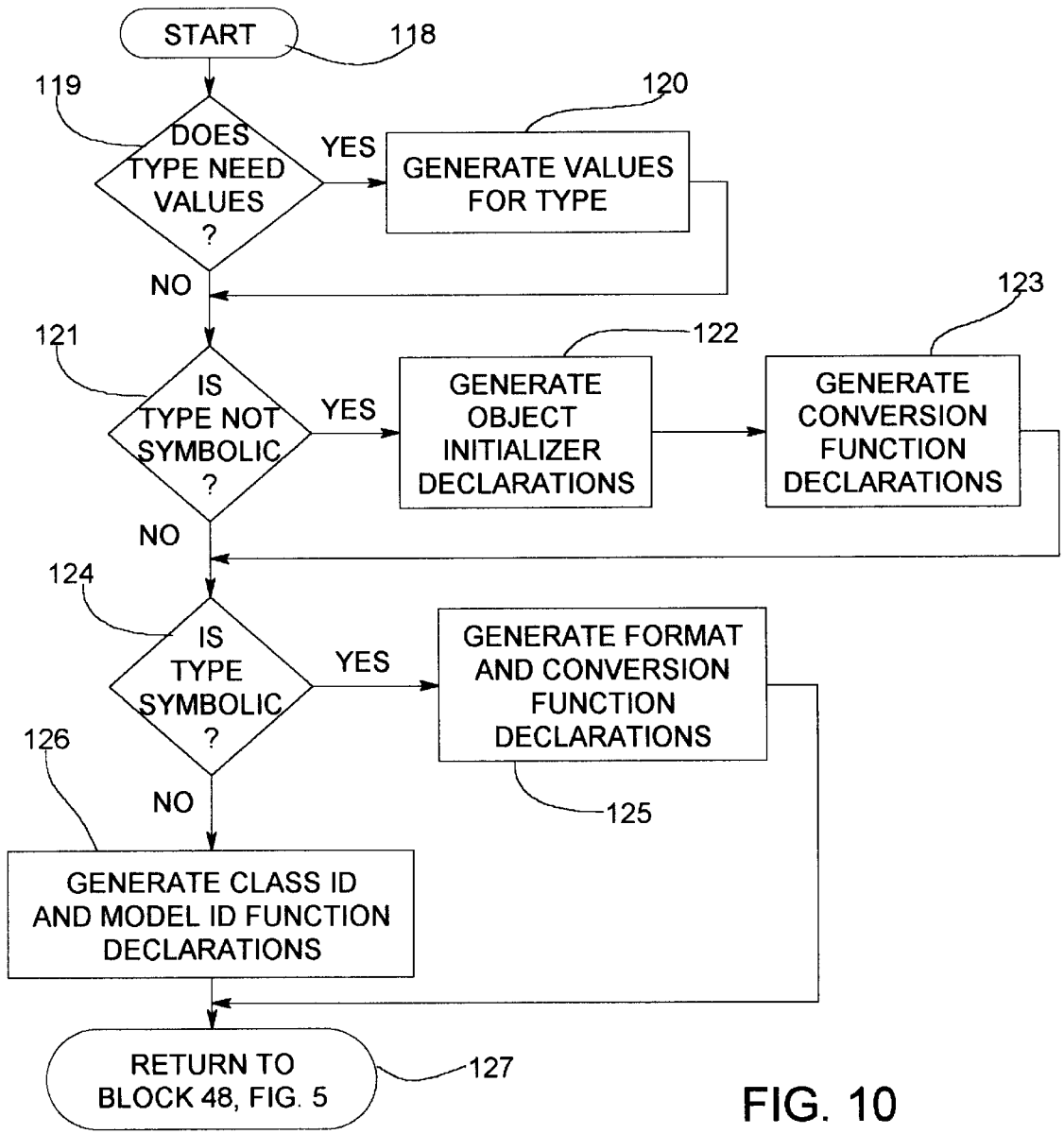
FIG. 10 is a flow chart that illustrates the steps for generating C function declarations for data types.
Figure 11:
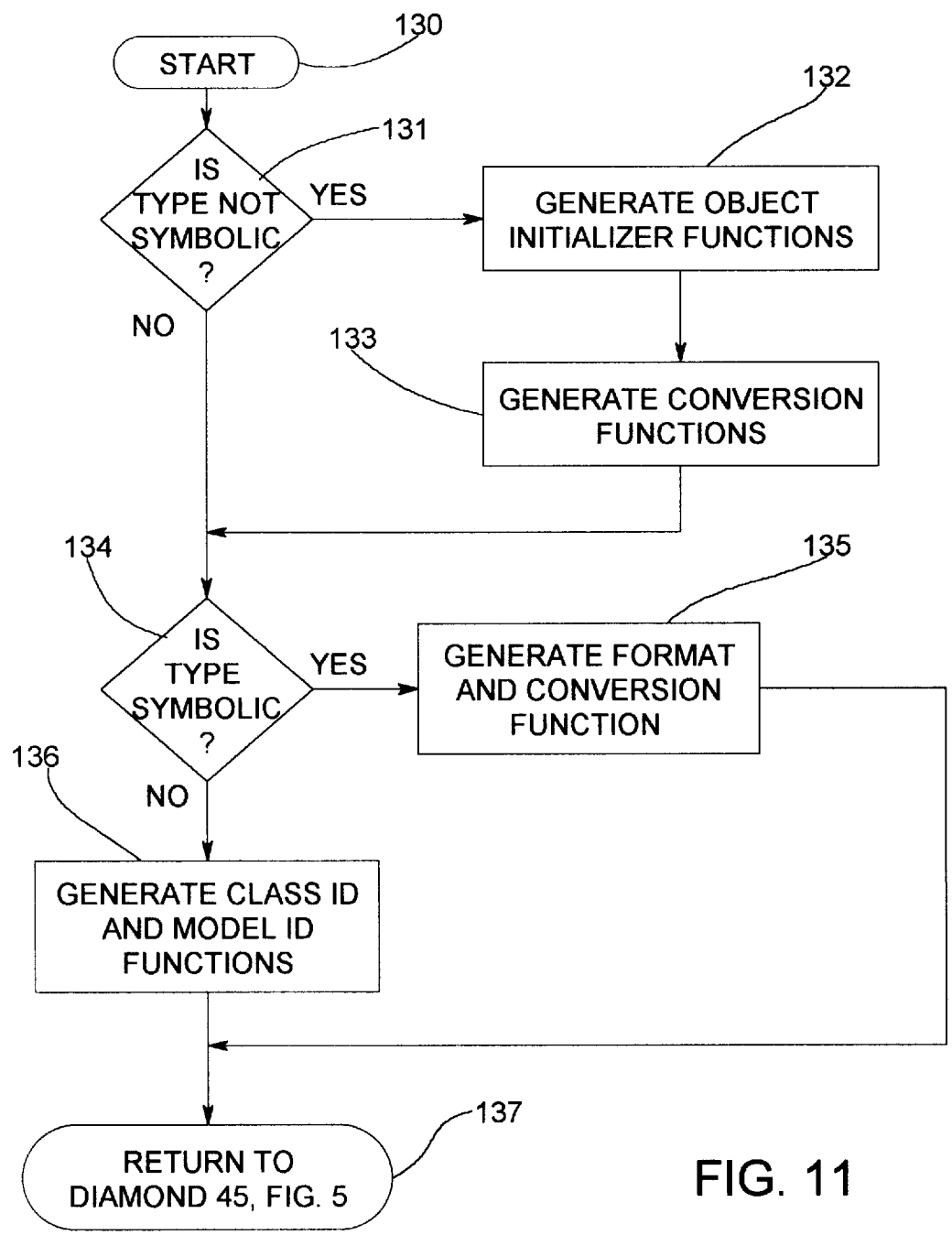
FIG. 11 is a flow chart that illustrates the steps for generating C to C++ wrapper functions for data types.

If the answer to the inquiry in the diamond 41 is no, then yet another inquiry is made as to whether or not there are more data types in model (diamond 45). If the answer to this inquiry is yes, then still another inquiry is made as to whether or not the current type is valid for C binding (diamond 46). This inquiry determines if the current type can be translated to a data type in the C language. If the answer to this inquiry is no then a return is made back to the diamond 45 for the next data type. On the other hand, if the type is valid then a process for generating C function declarations for data types is called (block 47). This process is shown in FIG. 10 and described further hereinafter. Next, a process for generating C to C++ wrapper functions for data types is called (block 48). This process is illustrated in FIG. 11 and described further hereinafter. Finally, a return is made back to the diamond 45 to process the next data type. If there are no more data types in model, then the process is stopped (bubble 49).

Figure 6:
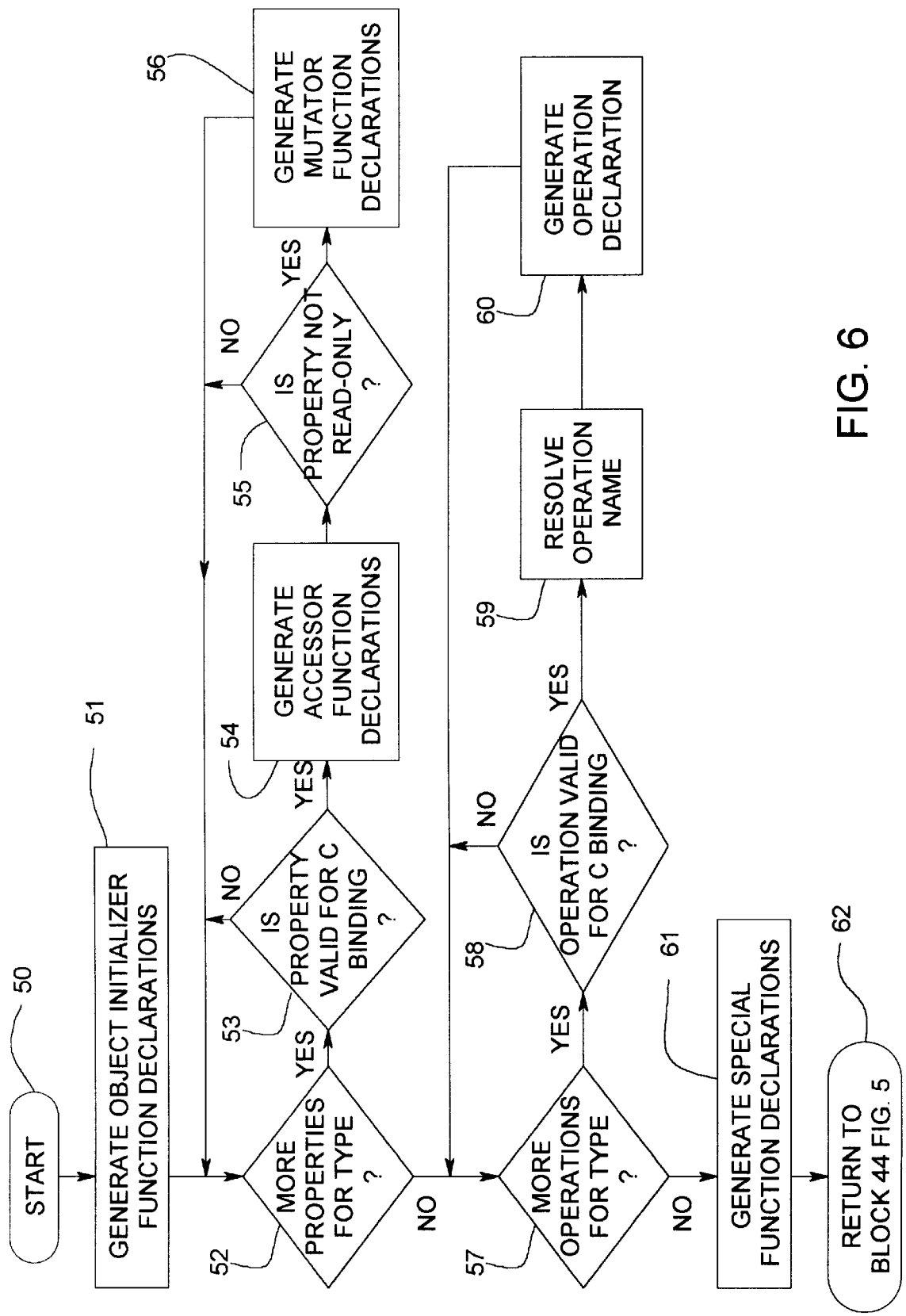
FIG. 6 is a flow chart that illustrates the steps for generating function declarations for types.
Figure 7:
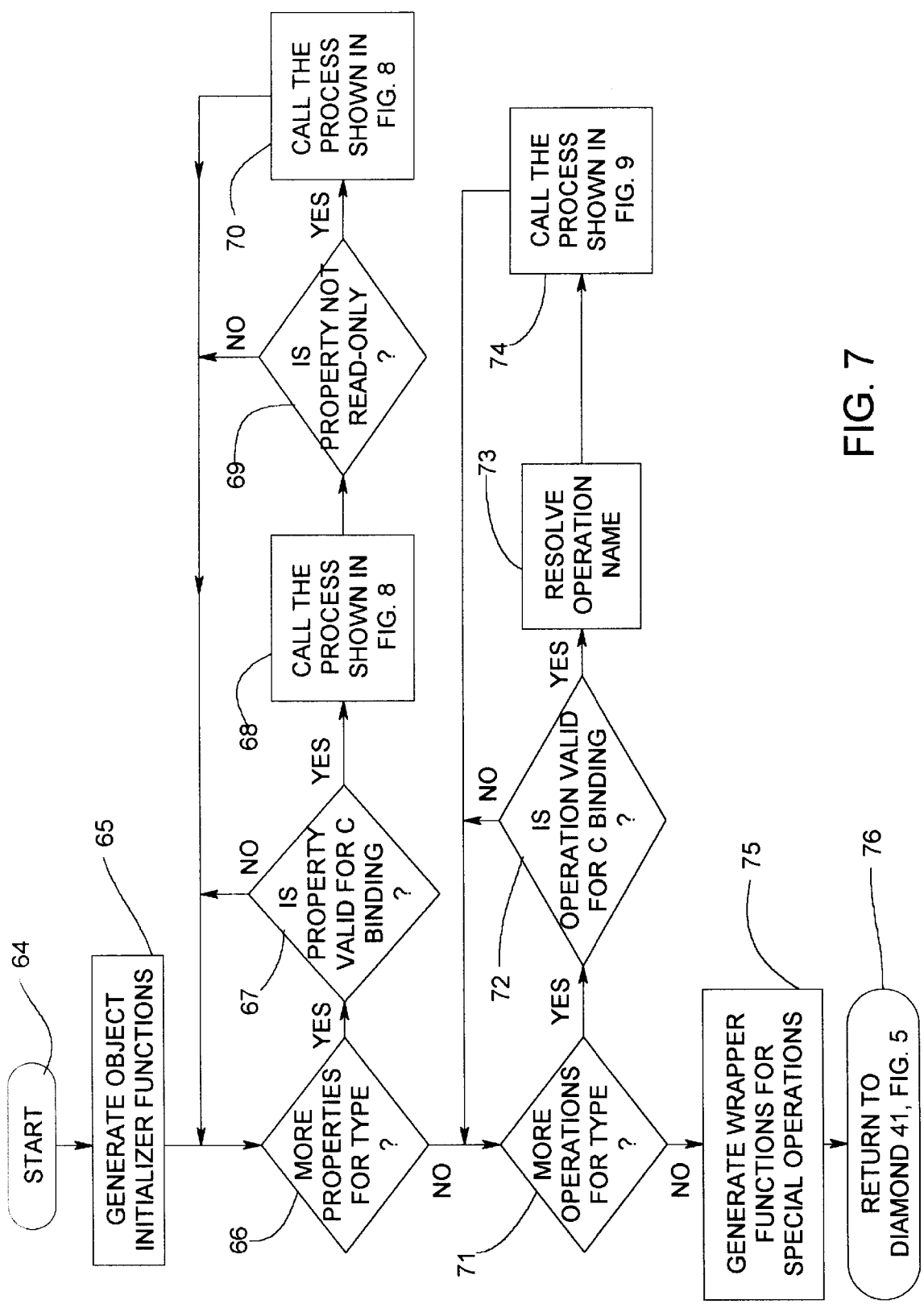
FIG. 7 is a flow chart that illustrates the steps for generating C to C++ wrapper functions.

Referring now to FIG. 6, a flow chart of the process alluded to above for generating function declarations for types is shown. The process begins with a start bubble 50 followed by a process step of generating object initializer function declarations (block 51). Next, an inquiry is made as to whether or not there are more properties for types (diamond 52). If the answer to this inquiry is yes, then another inquiry is made as to whether or not the property is valid for C binding (diamond 53). That is, this inquiry determines if the property is publicly available. If the answer to this inquiry is no, then a return is made back to the diamond 52 to process the next property for type. On the other hand if the answer to this inquiry is yes, then a process step of generating accessor function declarations is performed (block 54).

Following this process step, yet another inquiry is made as to whether or not property is not read-only (diamond 55). If the answer to this inquiry is no, then a return is made back to the diamond 52. On the other hand, if the property is not read-only, then a process step of generating mutator function declarations is performed (block 56). Finally, a return is made back to the diamond 52 for processing the next property for the type. If there are no more properties for type, then yet another inquiry is made as to whether or not there are more operations for type to process (diamond 57). If the answer to this inquiry is yes, then still another inquiry is made as to whether or not the operation is valid for C binding. If the answer to this inquiry is no, then a return is made back to the diamond 57. On the other hand if the answer to this inquiry is yes, then a process step of resolving operation name is performed (block 59). Next, an operation declaration is generated, block 60, and a return is made back to the inquiry 57 to determine if there are more operations for type. If there are no more operations for type, a process step of generating special function declarations is performed (block 61). Finally, the process returns to block 44 (FIG. 5), as depicted by a bubble 62.

Referring now to FIG. 7, a flow chart of the process for generating C to C++ wrapper functions is illustrated. The process begins with a start bubble 64, followed by a process step of generating object initializer functions (block 65). Next, an inquiry is made as to whether or not there are more properties for the type (diamond 66). If the answer to this inquiry is yes, then another inquiry is made as to whether or not property is valid for C binding (diamond 67). This inquiry determines whether or not the property for type is publicly accessible. If the answer to this inquiry is no, then a return is made back to the diamond 66. On the other hand, if the answer to this inquiry is yes, then a process is called for generating C to C++ wrapper code for accessor functions (block 68). This process is illustrated in FIG. 8 and described further hereinafter.

Following this, an inquiry is made as to whether or not property is not read-only (diamond 69). If the answer to this inquiry is no, then a return is made back to the diamond 66. On the other hand, if the answer is yes then the process for generating C to C++ wrapper code for mutator functions is called (block 70). This process is shown in FIG. 8 and described further hereinafter. Finally, a return is made back to the diamond 66 to process the next property for the type. If there are no more properties for the type, then another inquiry is made as to whether or not there are more operations for the type (diamond 71). If the answer to this inquiry is yes, then yet another inquiry is made as to whether or not the operation is valid for C binding (i.e., is the operation publicly accessible) (diamond 72). If the answer to this inquiry is no then a return is made back to the diamond 71 to process the next operation for type. On the other hand, if the answer to this inquiry is yes, then a process step of resolving operation name is performed (block 73). That is, a determination is made if the operation is overloaded for this type. If it is, then a numeric suffix is created which is appended to the function name in order to prevent duplicate function names. Next, a process for generating the C to C++ wrapper function for an operation is called (block 74). This process is shown in FIG. 9, which is described further hereinafter. Finally, a return is made back to the diamond 71 to process the next operation for type. If there are no more operations for type, then a process step of generating wrapper functions for special operations for the type is performed (block 75). Finally, the process returns to diamond 41 (FIG. 5), as depicted by a bubble 76.

Figure 8:
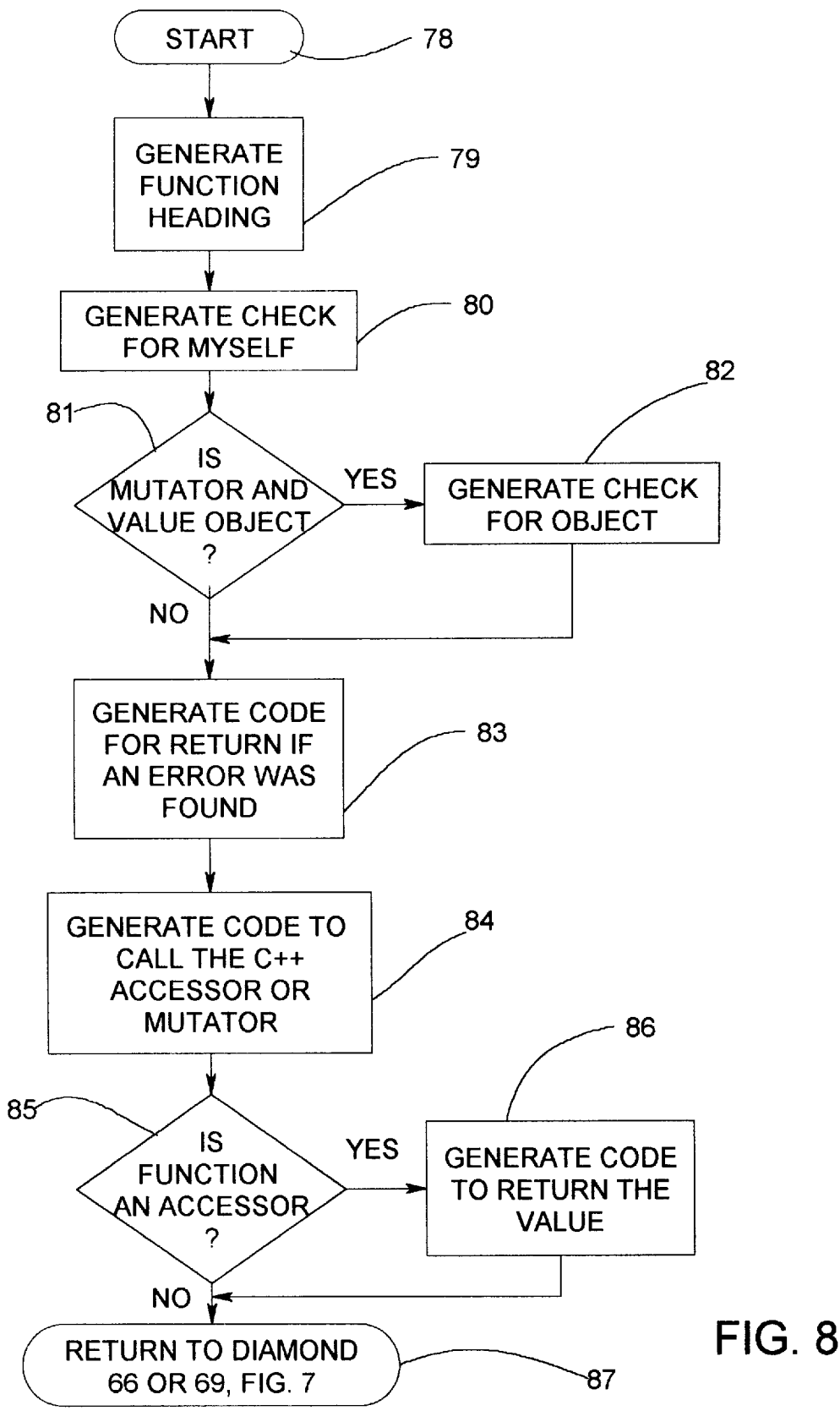
FIG. 8 is a flow chart that illustrates the steps for generating C to C++ wrapper code for accessor and mutator functions.

Referring now to FIG. 8, a process for generating C to C++ wrapper functions for accessors and mutators is illustrated. The process begins with a start bubble 78 followed by a process step of generating a function heading (block 79). Next, another process of generating the code for checking the myself parameter is performed (block 80). Following this, an inquiry is made as to whether or not a mutator function is being generated, and the property type is an object (diamond 81). If the answer to this inquiry is yes, then a process step of generating a check for the object parameter is performed (block 82). On the other hand, if the answer to the inquiry at diamond 81 is no (or once the process step 82 is complete), another process step of generating code for a return if an error was found (block 83). Next, a process step of generating code to call the C++ accessor or mutator (block 84) is performed. Following this, an inquiry is made to determine if the function being generated is an accessor (diamond 85). If the answer to this inquiry is yes, then a process step of generating code to return the value is performed (block 86). If the function is not an accessor (or on completion of the process step in block 86), the process returns to either diamond 69 or 66, depending upon whether this property was called by the step in block 68 or 70, respectively. This return step is depicted by a bubble 87.

Figure 9A:
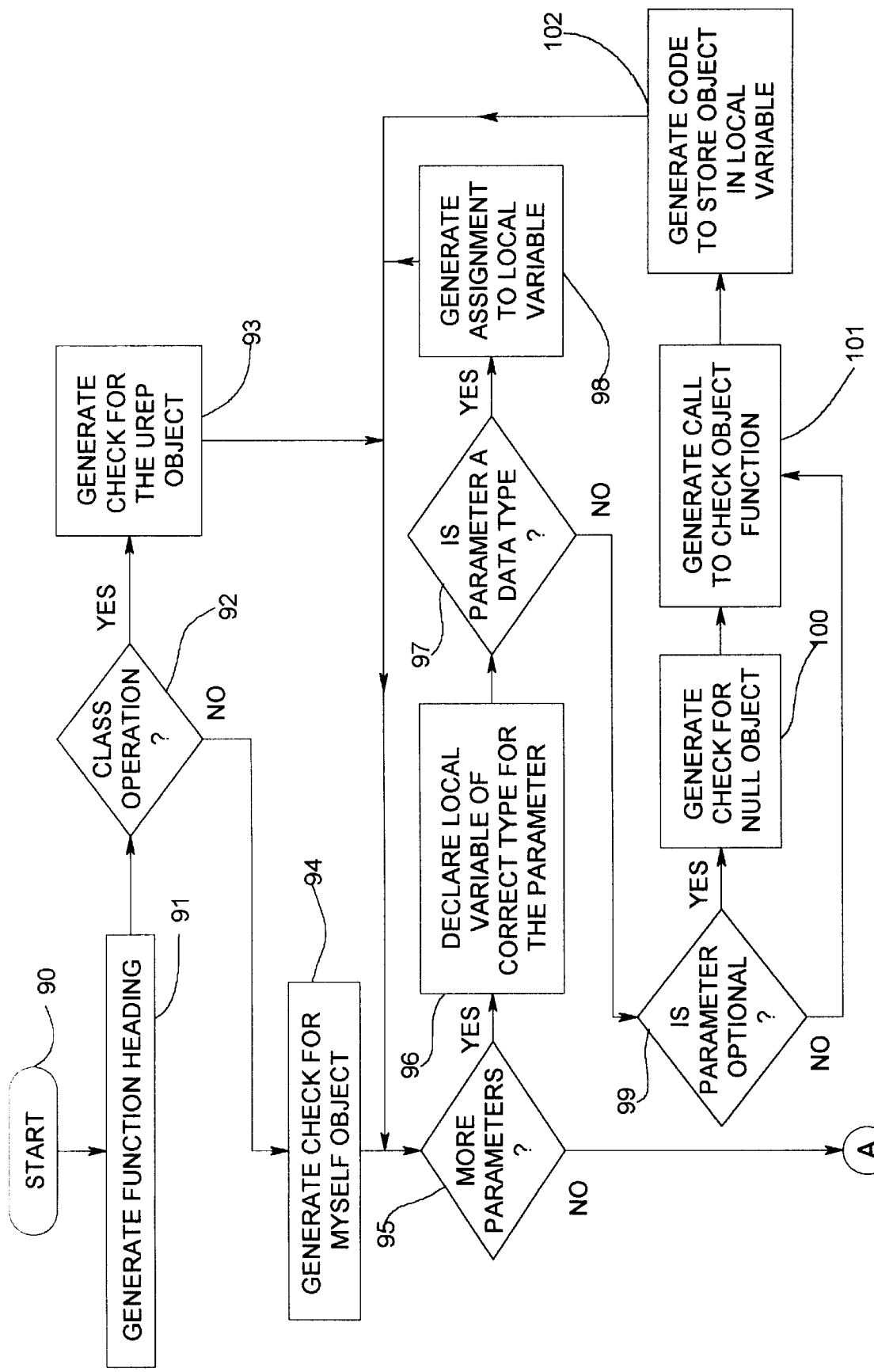
FIGS. 9A and 9B combined form a flow chart that illustrates the steps for generating the C to C++ wrapper function for an operation.

Referring now to FIG. 9A, which is the first of a two-part flow chart, the process for generating C to C++ wrapper functions for an operation is illustrated. The process begins with a start bubble 90 followed by a process step for generating a function heading with the return type and parameter list (block 91). That is, the C++ function is generated, which includes the return type, function name and a list of parameters enclosed in parentheses. Next, an inquiry is made as to whether or not this is a class operation (diamond 92). If the answer to this inquiry is yes, then a process step of checking for the UREP object is performed (block 93). That is, for class operations code is generated to check the value passed for the UREP parameter to insure that the C++ object it represents is of the correct type. On the other hand, if the answer to this inquiry is no, then another process step of generating a check for the myself parameter is performed (block 94). That is, code is generated to check the value of the myself parameter to insure that the C++ object it represents is the correct type for the operation.

Once the process steps 93 or 94 have been completed, an inquiry is made as to whether or not there are more parameters (diamond 95). If the answer to this inquiry is yes, then a process step of declaring local variable of correct type for the parameter is performed (block 96). Next, another inquiry is made as to whether or not the parameter is a data type, i.e., is it real, integer, Boolean, string, etc. (diamond 97). If the answer to this inquiry is yes, then a process step of generating an assignment of the parameter to the local variable is performed (block 98). Once this step has been performed, a return is made back to the diamond to process more parameters. On the other hand, if the answer to this inquiry is no, then yet another inquiry is made as to whether or not the parameter is optional (diamond 99). If the answer to this inquiry is yes, then another process step of generating a check for null object because the parameter is optional (block 100).

Following these steps, another process step of generating a call to a function to check the object that the parameter represents is performed (block 101). Once this step is complete, yet another process step is performed to generate code to store the object the parameter represents in a local variable. Next, a return is made back to the diamond 95 to process the next parameter. If the parameter is not optional (diamond 99), the process step of generating a check for a null object (block 100) is skipped and the process step of generating a call to check the object is then performed (block 101). Finally, if there are no more parameters a branch is taken (via connector "A") to an inquiry as to whether or not the operation has a return value (diamond 103, FIG. 9B).

Figure 9B:
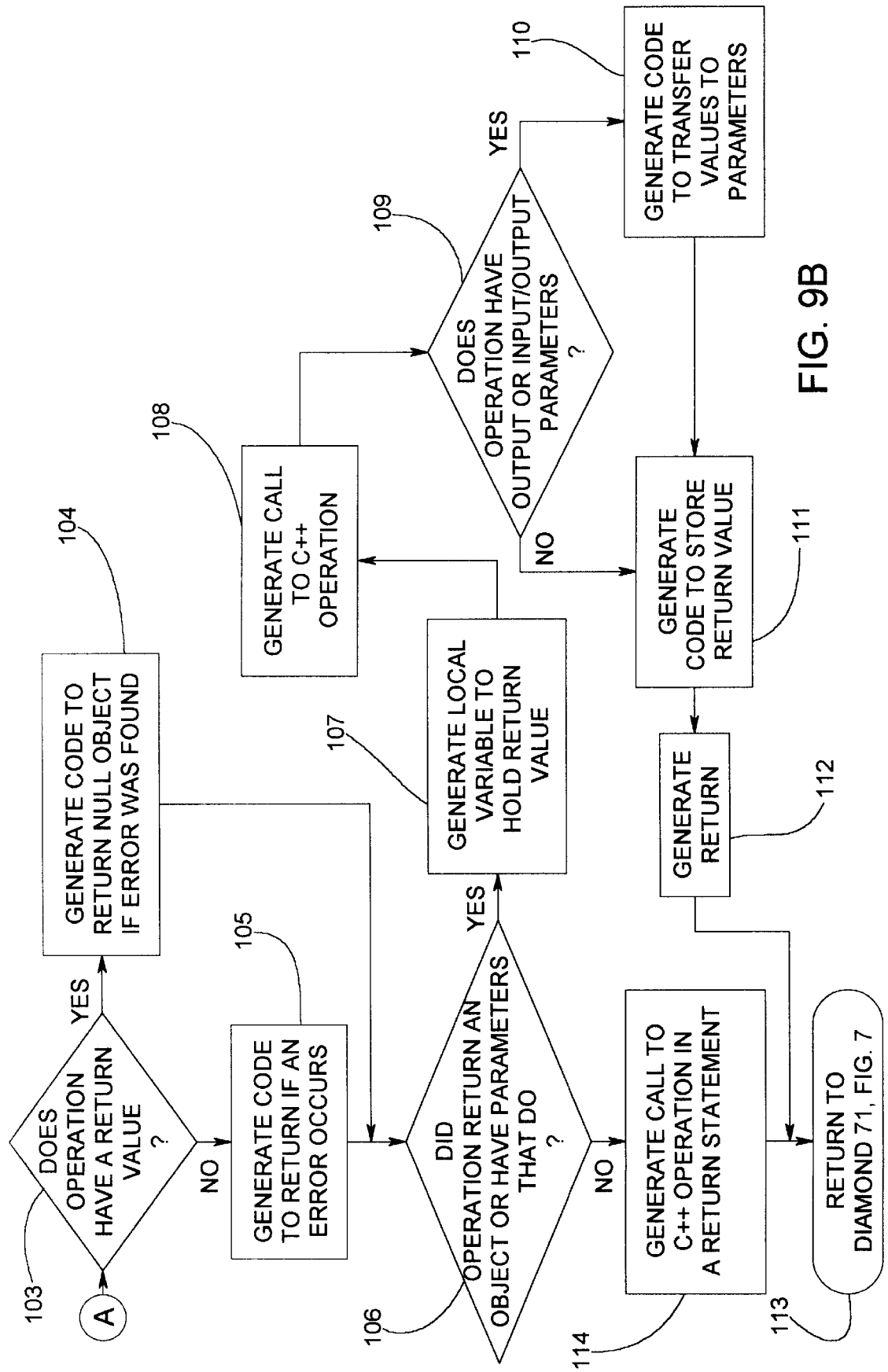

Referring now to FIG. 9B, the second half of the process for generating C to C++ wrapper function for an operation is illustrated. If the operation has a return value (diamond 103), then code is generated to return a null object or value if an error is found when the parameters are checked (block 104). On the other hand, if the operation does not have a return value, then code is generated to return if an error occurs when the parameters are checked (block 105). Next, an inquiry is made as to whether or not the operation returns an object, or has an output or an input/output parameter (diamond 106). If the answer to this inquiry is yes, then a local variable is generated to hold a return value (block 107). Next, code is generated to call the C++ operation and capture the return value in the local variable (block 108).

Following these steps, an inquiry is made as to whether or not the operation has output or input/output parameters (diamond 109). If the answer to this inquiry is yes, then code is generated to transfer values of output or input/output parameters from the C++ objects to the C parameters (block 110). On completion of this step, or if the operation does not have output or input/output parameters, code is generated to store the return value (block 111). Next, a return is generated and the process returns to the diamond 71 (FIG. 7), as depicted by a bubble 113. If the operation did not return an object or has parameters that do (diamond 106), then code is generated to call the C++ operation in a return statement (block 114) followed by a return to the diamond 71 (FIG. 7).

Referring now to FIG. 10, the process for generating function declarations for data types is illustrated. The process begins with a start bubble 118, followed by an inquiry (diamond 119) as to whether or not the type needs values (i.e., limits for strings and integers, enumeration for symbolic types, etc.). If the answer to this inquiry is yes, then values for the type as C enums are generated (block 120). Once this step is complete, or if the type does not need values, another inquiry is made as to whether or not the type is not symbolic (diamond 121). If the answer to this inquiry is yes, then object initializer function declarations are generated (block 122). Next, conversion function declarations are generated (block 123).

Following these steps, yet another inquiry is made as to whether or not type is symbolic (diamond 124). If the answer to this inquiry is yes, then the format and conversion function declarations are generated (block 125). If the type is not symbolic, the class id and model id function declarations are generated (block 126). After completion of this step, or upon completion of the process step 125, the process returns to block 48 (FIG. 5), as depicted by a bubble 127.

Referring now to FIG. 11, the process for generating C to C++ wrapper functions for data types is illustrated. The process begins with a start bubble 130, followed by an inquiry as to whether or not the data type is not symbolic (diamond 131). If the data is not symbolic, then object initializer functions are generated (block 132). Next, conversion functions are generated (block 133). Following these steps, or if the data type is symbolic (diamond 131), another inquiry is made as to whether or not type is symbolic (diamond 134). If the answer to this inquiry is yes, then format and conversion functions for the symbolic type are generated (block 135). If the type is not symbolic, then class id and model id functions are generated (block 136). Once this step is complete, or following completion of the step in process block 135, the process returns to diamond 45 (FIG. 5), as depicted by a bubble 137.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computer system having a user interface, a CPU, a memory, at least one disk drive, and an object-oriented repository, a program operating in said computer system for accessing said object-oriented repository, said program executing a method for mapping types in a model stored in said repository to language constructs for a C binding to said repository and writing said language constructs to a file on said at least one disk drive comprising the steps of:

a. for each type in said model, determining if a current one of said types is valid for C binding, and if so;

b. generating object initializer function declarations for said current type;

c. determining if there are more properties for said current type, and if so;

d. for each property for said current type, determining if a current one of said properties is valid for C binding, and if so;

e. generating accessor function declarations for said current property;

f. determining if said current property is not read-only, and if so;

g. generating mutator function declarations for said current property;

h. if there are no more properties for said current type, determining if there are more operations for said current type, and if so;

i. for each operation for said current type, determining if a current one of said operations is valid for C binding, and if so;

j. resolving operation name for said current operation;

k. generating declaration for said current operation;

l. if there are no more operations for said current type, generating special function declarations; and, m. generating C to C++ wrapper functions for said current type;

n. determining if there are more of said types in said model, and if so, repeating steps a through n hereof;

o. if there are no more types, then;

p. for each data type in said model, determining if a current one of said data types is valid for C binding, and if so;

q. generating function declarations for said current data type;

r. generating C to C++ wrapper functions for said current data type;

s. determining if there are more data types in said model, and if so, repeating steps p through s hereof; and, t. if there are no more data types in said model, stopping said program.

2. A method as in claim 1 wherein said step of generating C to C++ wrapper function for said current type further comprises:

u. generating object initializer functions for said current type;

v. determining if there are more properties for said current type, and if so;

w. for each property for said current type, determining if a current one of said properties is valid for C binding, and if so;

x. generating C to C++ wrapper code for accessor functions for said current property, y. determining if said current property is not read-only, and if so;

z. generating C to C++ wrapper code for mutator functions for said current property;

aa. if there are no more properties for said type, determining if there are more operations for said type, and if so;

ab. for each operation for said type, determining if a current one of said operations is valid for C binding, and if so;

ac. resolving operation name for said current operation;

ad. generating a C to C++ wrapper function for said current operation; and, ae. if there are no more operations for said type, generating a wrapper function for any special operations; and, af. returning to step n of claim 1 hereof.

3. A method as in claim 2 wherein said step of generating C to C++ wrapper code for accessor functions further comprises:

ag. generating function heading with correct parameters;

ah. generating code to check myself parameter;

ai. generating code for return if an error was found;

aj. generating code to call C++ accessor;

ak. generating code to return a value for said accessor; and, al. returning to said program at step y of claim 2.

4. A method as in claim 2 wherein said step of generating C to C++ wrapper code for mutator functions further comprises:

ag. generating function heading with correct parameters;

ah. generating code to check myself parameter;

ai. determining if said current property type is an object, and if so;

aj. generating code to check object parameter;

ak. generating code for return if an error was found;

al. generating code to call C++ mutator; and, am. returning to step w of claim 2 hereof.

5. A method as in claim 2 wherein said step of generating C to C++ wrapper function for an operation further comprises:

ag. generating function heading with a return type and a parameter list for said operation;

ah. determining if said operation is a class operation, and if so;

ai. generating a check for UREP object parameter;

aj. if said operation is not a class operation, generating a check for myself object parameter;

ak. determining if there are more parameters, and if so;

al. for each parameter, declaring a local variable for correct type for a current one of said parameters;

am. determining if said current parameter is a data type, and if so, an. generating an assignment to said local variable;

ao. if said current parameter is not a data type, determining if said current parameter is optional, and if so;

ap. generating a check for a null object for said current parameter;

aq. generating a call to check object function for said current parameter;

ar. generating code to store value in said local variable;

as. if there are no more parameters for said operation, determining if said operation has a return value, and if so;

at. generating code to return a null object if an error was found;

au. if said operation does not have a return value, generating code to return if an error occurs;

av. determining if said operation returns a value or a has a parameter that returns a value, and if so;

aw. generating a local variable to hold said return value;

ax. generating a call to said operation in C++ binding, and capturing said return value in said local variable;

ay. determining if said current operation has output or input/output parameters, and if so;

az. generating code to transfer values from C++ operation call to each of said parameters;

ba. generating code to store said return value;

bb. generating a return;

bc. if said current operation does not return an object, generating a call to C++ operation in a return statement;

bd. if said current operation does not return a parameter with an object, generating a call to C++ operation in a return statement; and, be. returning to said program at step ab of claim 2 hereof.

6. A method as in claim 1 wherein said step of generating function declarations for said current data type further comprises:
   u. determining if said current data type needs values, and if so;
   v. generating values for said current data type;
   w. determining if said current data type is not symbolic, and if not:
      i) generating object initializer declarations;
      ii) generating conversion function declarations;
   x. determining if said current data type is symbolic, and if so;
   y. generating format and conversion function declarations;
   z. if said current data type is not symbolic, generating class id and model id function declarations; and,
   aa. returning to said program at step r of claim 1 hereof.

7. A method as in claim 1 wherein said step of generating C to C++ wrapper functions for said current data type further comprises:
   u. determining if said current data type is not symbolic, and if not:
      i) generating object initializer functions;
      ii) generating conversion functions;
   v. if said current data type is not not symbolic, determining if said current data type is symbolic, and if so;
   w. generating format and conversion functions;
   x. if said current data type is not symbolic, generating class id and model id functions; and,
   y. returning to said program at step s of claim 1 hereof.

8. In a computer system having a user interface, a CPU, a memory, at least one disk drive, and an object-oriented repository, a program operating in said computer system for accessing said object-oriented repository, said program executing a method for mapping types in a model stored in said repository to language constructs for a C binding to said repository and writing said language constructs to a file on said at least one disk drive comprising the steps of:
   a. for each type in said model, determining if a current one of said types is valid for C binding, and if so;
   b. generating object initializer function declarations for said current type;
   c. determining if there are more properties for said current type, and if so;
   d. for each property for said current type, determining if a current one of said properties is valid for C binding, and if so;
   e. generating accessor function declarations for said current property;
   g. determining if said current property is not read-only, and if so;
   h. generating mutator function declarations for said current property;
   i. if there are no more properties for said current type, determining if there are more operations for said current type, and if so;
   j. for each operation for said current type, determining if a current one of said operations is valid for C binding, and if so;
   k. resolving operation name for said current operation;
   l. generating declaration for said current operation;
   m. if there are no more operations for said current type, generating special function declarations;
   n. generating C to C++ wrapper functions for said current type;
   o. determining if there are more of said types in said model, and if so, repeating steps a through n hereof;
   p. if there are no more types, then;
   q. for each data type in said model, determining if a current one of said data types is valid for C binding, and if so;
   r. generating function declarations for said current data type;
   s. generating C to C++ wrapper functions for said current data type; and,
   t. determining if there are more data types in said model, and if so, repeating steps q through s hereof;
   u. if there are no more data types in said model, stopping said program.

9. A method as in claim 8 wherein said step of generating C to C++ wrapper functions for said current type further comprises:
   v. generating object initializer functions for said current type;
   w. determining if there are more properties for said current type, and if so;
   x. for each property for said current type, determining if a current one of said properties is valid for C binding, and if so;
   y. generating C to C++ wrapper code for accessor functions for said current property,
   z. determining if said current property is not read-only, and if so;
   aa. generating C to C++ wrapper code for mutator functions for said current property;
   ab. if there are no more properties for said type, determining if there are more operations for said type, and if so;
   ac. for each operation for said type, determining if a current one of said operations is valid for C binding, and if so;
   ad. resolving operation name for said current operation;
   ae. generating a C to C++ wrapper function for said current operation; and,
   af. if there are no more operations for said type, generating a wrapper function for any special operations; and,
   ag. returning to step o of claim 8 hereof.

10. A method as in claim 9 wherein said step of generating C to C++ wrapper code for accessor functions further comprises:
    ah. generating function heading with correct parameters;
    ai. generating code to check myself parameter;
    aj. generating code for return if an error was found;
    ak. generating code to call C++ accessor;
    al. generating code to return a value for said accessor; and,
    am. returning to said program at step z of claim 9.

11. A method as in claim 9 wherein said step of generating C to C++ wrapper code for mutator functions further comprises:
    ah. generating function heading with correct parameters;
    ai. generating code to check myself parameter;
    ad. determining if said current property type is an object, and if so;
    ak. generating code to check object parameter;

al. generating code for return if an error was found;

am. generating code to call C++ mutator; and, an. returning to step x of claim 9 hereof.

12. A method as in claim 9 wherein said step of generating C to C++ wrapper function for an operation further comprises:

ah. generating function heading with a return type and a parameter list for said operation;

ai. determining if said operation is a class operation, and if so;

aj. generating a check for UREP object parameter;

ak. if said operation is not a class operation, generating a check for myself object parameter;

al. determining if there are more parameters, and if so;

am. for each parameter, declaring a local variable for correct type for a current one of said parameters;

an. determining if said current parameter is a data type, and if so, ao. generating an assignment to said local variable;

ap. if said current parameter is not a data type, determining if said current parameter is optional, and if so;

aq. generating a check for a null object for said current parameter;

ar. generating a call to check object function for said current parameter;

as. generating code to store value in said local variable;

m. if there are no more parameters for said operation, determining if said operation has a return value, and if so;

at. generating code to return a null object if an error was found;

au. if said operation does not have a return value, generating code to return if an error occurs;

av. determining if said operation returns a value or a has a parameter that returns a value, and if so;

aw. generating a local variable to hold said return value;

ax. generating a call to said operation in C++ binding, and capturing said return value in said local variable;

ay. determining if said current operation has output or input/output parameters, and if so;

az. generating code to transfer values from C++ operation call to each of said parameter;

ba. generating code to store said return value;

bb. generating a return;

bc. if said current operation does not return an object, generating a call to C++ operation in a return statement;

bd. if said current operation does not return a parameter with an object, generating a call to C++ operation in a return statement; and, be. returning to said program at step ac of claim 9 hereof.

* * * * *